(12) United States Patent
Siskind et al.

(10) Patent No.: US 11,823,128 B2
(45) Date of Patent: *Nov. 21, 2023

(54) LARGE-SCALE AUTOMATED IMAGE ANNOTATION SYSTEM

(71) Applicant: Target Brands, Inc., Minneapolis, MN (US)

(72) Inventors: Ryan Siskind, Minneapolis, MN (US); Matthew Nokleby, Minneapolis, MN (US); Nicholas Eggert, Inver Grove Heights, MN (US); Stephen Radachy, Minneapolis, MN (US); Corey Hadden, Minneapolis, MN (US); Rachel Alderman, Minneapolis, MN (US); Edgar Cobos, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/072,919

(22) Filed: Dec. 1, 2022

(65) Prior Publication Data

US 2023/0092381 A1   Mar. 23, 2023

Related U.S. Application Data

(63) Continuation of application No. 17/091,952, filed on Nov. 6, 2020, now Pat. No. 11,531,838.
(Continued)

(51) Int. Cl.
*G06K 9/00* (2022.01)
*G06Q 10/087* (2023.01)
(Continued)

(52) U.S. Cl.
CPC ......... *G06Q 10/087* (2013.01); *G06F 18/214* (2023.01); *G06F 18/24* (2023.01);
(Continued)

(58) Field of Classification Search
CPC .......................................... G06T 2207/10028
See application file for complete search history.

(56) References Cited

U.S. PATENT DOCUMENTS 8,905,314 B2   12/2014   van der Merwe et al.
9,477,955 B2   10/2016   Goncalves
(Continued)

OTHER PUBLICATIONS

Bonnett, Classifying E-Commerce Products Based on Images and Text; https://blog.insightdatascience.com/classifying-e-commerce-products-based on-images-and text; Dated Jun. 8, 2020; 7 Pages.
(Continued)

*Primary Examiner* — Hadi Akhavannik
(74) *Attorney, Agent, or Firm* — Merchant & Gould P.C.

(57) ABSTRACT

Systems and methods for automating image annotations are provided, such that a large-scale annotated image collection may be efficiently generated for use in machine learning applications. In some aspects, a mobile device may capture image frames, identifying items appearing in the image frames and detect objects in three-dimensional space across those image frames. Cropped images may be created as associated with each item, which may then be correlated to the detected objects. A unique identifier may then be captured that is associated with the detected object, and labels are automatically applied to the cropped images based on data associated with that unique identifier. In some contexts, images of products carried by a retailer may be captured, and item data may be associated with such images based on that retailer's item taxonomy, for later classification of other/future products.

20 Claims, 6 Drawing Sheets

Related U.S. Application Data (60) Provisional application No. 62/932,956, filed on Nov. 8, 2019.

(51) Int. Cl.
| | |
|---|---|
| *G06T 7/11* | (2017.01) |
| *G06T 7/20* | (2017.01) |
| *G06T 11/00* | (2006.01) |
| *G06Q 30/018* | (2023.01) |
| *G06K 7/14* | (2006.01) |
| *G06N 20/00* | (2019.01) |
| *G06T 7/70* | (2017.01) |
| *G06V 20/00* | (2022.01) |
| *G06V 20/40* | (2022.01) |
| *G06F 18/214* | (2023.01) |
| *G06F 18/24* | (2023.01) |
| *G06V 10/25* | (2022.01) |
| *G06V 10/774* | (2022.01) |
| *G06K 7/10* | (2006.01) |

(52) U.S. Cl.
CPC ........... *G06K 7/1413* (2013.01); *G06N 20/00* (2019.01); *G06Q 30/0185* (2013.01); *G06T 7/11* (2017.01); *G06T 7/20* (2013.01); *G06T 7/70* (2017.01); *G06T 11/00* (2013.01); *G06V 10/25* (2022.01); *G06V 10/774* (2022.01); *G06V 20/00* (2022.01); *G06V 20/40* (2022.01); *G06K 2007/10504* (2013.01); *G06T 2207/10016* (2013.01); *G06T 2207/20081* (2013.01); *G06T 2207/20132* (2013.01); *G06T 2210/12* (2013.01)

(56) References Cited

U.S. PATENT DOCUMENTS

| | | | |
|---|---|---|---|
| 9,600,982 | B2 | 3/2017 | MacIntosh |
| 10,176,452 | B2 | 1/2019 | Rizzolo et al. |
| 11,531,838 | B2* | 12/2022 | Siskind ................ G06F 18/24 |
| 2012/0128250 | A1* | 5/2012 | Petrou ................. G06V 30/413 |
| | | | 382/182 |
| 2015/0310601 | A1 | 10/2015 | Rodriguez et al. |
| 2017/0135655 | A1* | 5/2017 | Wang .................... G06T 11/008 |
| 2017/0249491 | A1 | 8/2017 | MacIntosh et al. |
| 2019/0311489 | A1* | 10/2019 | Lam ......................... G06T 7/73 |
| 2019/0325259 | A1* | 10/2019 | Murphy ............. G06F 18/2148 |

OTHER PUBLICATIONS

Dekhordy, Automated Image Classification Via Unsupervised Feature Learning by K-Means; Preview of Purdue University (Graduate School) Thesis/Dissertation Acceptance; Dated Jun. 26, 2015; 17 Pages.

thehive.ai—Hive Data—Create training datasets for computer vision models with our fully manage solution; Dated Jun. 8, 2020; 6 Pages.

* cited by examiner

LARGE-SCALE AUTOMATED IMAGE ANNOTATION SYSTEM

CROSS-REFERENCE TO RELATED APPLICATIONS

The present application is a continuation of U.S. patent application Ser. No. 17/091,952, filed Nov. 6, 2020, which claims priority from U.S. Provisional Patent Application No. 62/932,956, filed on Nov. 8, 2019, the disclosure of which are hereby incorporated by reference in their entirety.

BACKGROUND

Computer vision applications are often configured to perform image recognition and classification of objects appearing in images. However, accuracy of computer vision applications is dependent not only on the computer vision system itself, but also on the availability of sufficient, accurate datasets used for training that computer vision system.

The availability of publicly-accessible, large-scale, labeled image datasets such as ImageNet, MS-COCO, and Open Images eases the burden of collecting and labeling images for computer vision applications. The primary objectives for each of these datasets are to train object detection/segmentation models and to provide high-level classification of detected objects. However, if the goal of a computer vision framework is for finer-grained classification than theses datasets permit, an additional batch of labeled images is necessary. The effort involved in collecting the additional data not only falls on the researcher, but is both time-consuming and error-prone. Accordingly, large-scale labeled image collection is necessary to advance the current state of fined-grained classification in contexts with scarce training data.

Modern approaches to fine-grained classification are based on deep metric learning, in which images are mapped through a convolutional neural network (CNN) to a low-dimensional feature space and classified via nearest neighbors against a catalog of labeled images. Existing approaches to learning deep embeddings use the final feature layer of CNNs pre-trained on existing coarse-grained categorized image collections, such as ImageNet, with subsequent enhancements. For example, loss functions have been applied to learn an embedding that places images from the same class nearby to each other and other images far apart, which produces an embedding that discerns fine-grained differences between classes while learning from a relatively shallow dataset. In other instances, unsupervised and semi-supervised methods have been used to learn fine-grained differences from the inherent structure of the images, which are aided by weak cues in the dataset.

Furthermore, a variety of methods have been proposed for the automatic curation of fine-grained image datasets. These include Webly supervised learning (WSL), which crawls webpages (such as Flickr) for images that match a text query. These automatically-generated annotations generally must be augmented by some human annotation.

While there is significant literature available that is directed to multiple-object recognition and tracking, often fine-grained classification problems rely in classifications that are tuned to the specific types of classes that are required for the application at hand. Accordingly, while some fine-grained training datasets exist, often those datasets are manually curated and not appropriate to the classification problem at hand. Accordingly, improvements in rapid creation of accurate fine-grained image datasets are desired.

SUMMARY

In general methods and systems are described that include a process by which large-scale, fine-grained image classifications may be rapidly created for use as a training dataset for image classification machine learning applications.

In a first aspect, a method of generating a fine-grained annotated image collection is disclosed. The method includes capturing a plurality of image frames via a mobile device, the image frames depicting a plurality of product items, and, for each of the plurality of image frames, generating one or more cropped images, the one or more cropped images representing each product item appearing in the image frame. The method further includes detecting a plurality of objects appearing across the plurality of image frames, and associating at least one of the cropped images generated from an image frame with a detected object from among the plurality of objects tracked across the plurality of image frames. The method also includes capturing, via the mobile device, a unique identifier of the detected object. The method includes annotating the at least one cropped image by applying a label to the at least one cropped image, wherein applying the label includes determining an item label of the detected object based on the unique identifier and associating the item label with the at least one cropped image.

In a second aspect, a system includes a mobile device having a mobile application installed thereon. The mobile application includes executable instructions which, when executed, cause the mobile device to perform: in a first mode, capturing a plurality of image frames via a camera of the mobile device, the plurality of image frames depicting a plurality of product items; for each of the plurality of image frames, generating one or more cropped images, the one or more cropped images representing each product item appearing in the image frame; detecting a plurality of objects appearing across the plurality of image frames; in a second mode, capturing a unique identifier associated with each detected object, the unique identifier being an identity of an object within a fine-grained image taxonomy; and transmitting the plurality of cropped images, information regarding the plurality of objects, and the unique identifier associated with each of the plurality of objects to a remote computing system to form an annotated image collection.

In a third aspect, a method includes capturing a plurality of image frames via a mobile device, the image frames depicting a plurality of product items offered by a retailer, the plurality of product items organized into an item classification. The method further includes for each of the plurality of image frames, generating one or more cropped images, the one or more cropped images representing each product item appearing in the image frame. The method also includes detecting a plurality of objects appearing across the plurality of image frames. The method includes associating at least one of the cropped images generated from an image frame with each detected object of the plurality of objects tracked across the plurality of image frames, and capturing, via the mobile device, a unique identifier of each detected object. The method includes annotating each cropped image that is associated with a detected object of the plurality of objects by applying a label to the cropped image, wherein applying the label includes determining an item label of the detected object based on the unique identifier and associating the item label with the cropped image, thereby automatically forming an image classification training dataset.

BRIEF DESCRIPTION OF THE DRAWINGS

The same number represents the same element or same type of element in all drawings.

DETAILED DESCRIPTION

As briefly described above, embodiments of the present invention are directed to a method for collecting and labeling a massive number of images in a relatively short amount of time using an annotation application. The collection and labeling of images simplifies the process of developing specific dataset useable for training computer vision systems or other machine learning system.

In some embodiments, the methods and systems described herein are applied for food and beverages sold in a retail context. However, these methods and systems are applicable in a variety of other domains.

In accordance with the methods and systems described herein, a dataset has been generated that allows for fine-grained classification, utilizing over 275,000 images of food and beverage products found on the shelves of a national retailer in a single metropolitan area. The collection may include images collected by the annotation application described herein, in combination with professionally generated images of products to aid in domain transfer applications.

As further discussed herein, accuracy baselines for classification, instance retrieval, and domain adaptation with the generated dataset are established. In that context, a deep metric learning pipeline, trained using n-pairs and proxy-NCA losses, gives reasonable accuracy on classification and retrieval accuracy on the dataset as generated, thereby validating the automated generation of that dataset.

Figure 1:
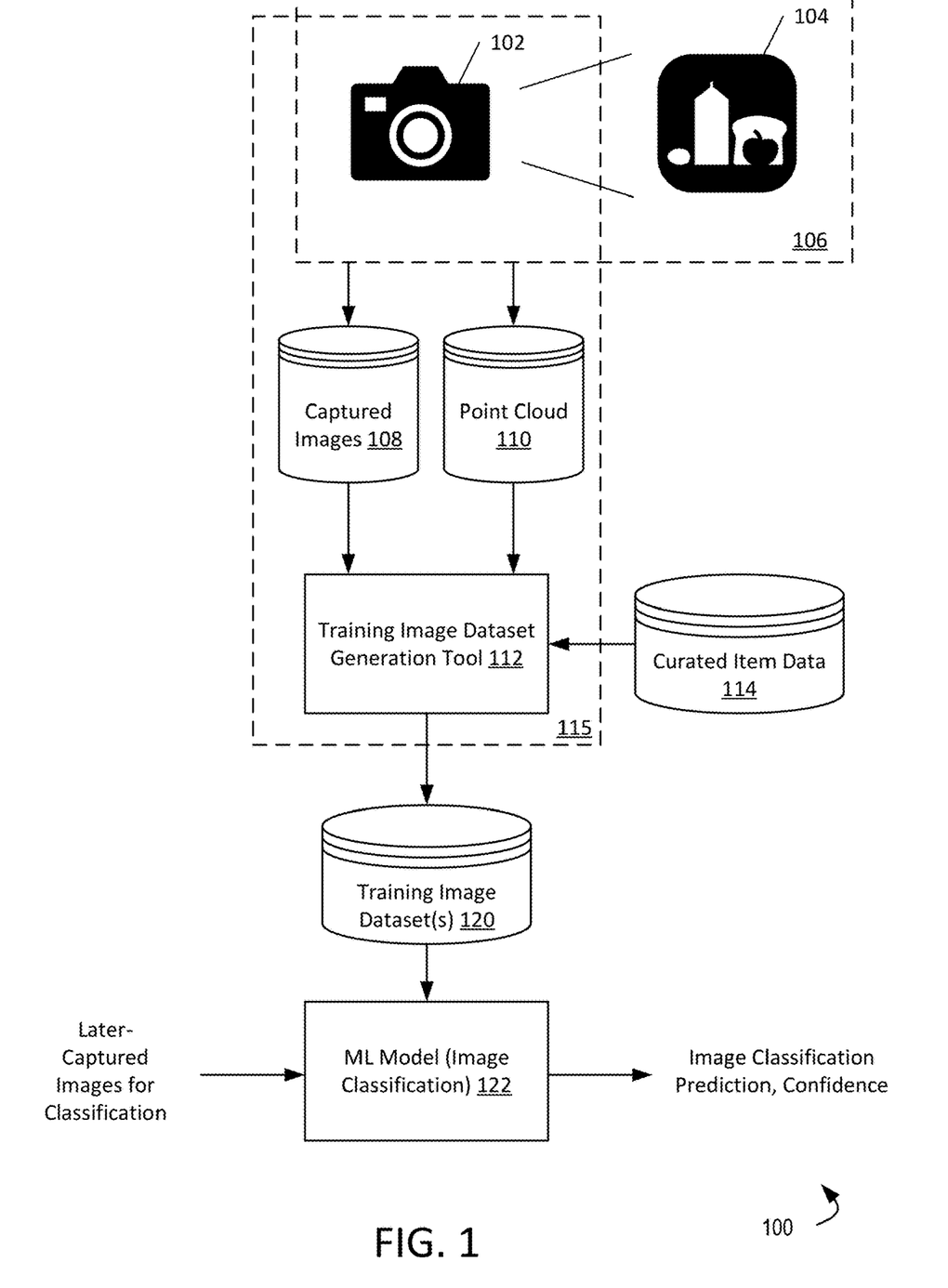
FIG. 1 is a general process flow illustrating large-scale image collection for fine-grained image classification, according to example embodiments of the present disclosure.

FIG. 1 is a general process flow 100 illustrating large-scale image collection for fine-grained image classification and training, for use in image classification subsystems. As described above, the general process flow 100 may be performed using a mobile device including a camera, as well as a server to assist with processing of image and detected object data. For example, the general process flow 100 may be performed, at least in part, on items in a natural environment. In example implementations, portions of the process flow 100 may be performed on real world item collections, such as may be found at a store location of a retailer.

In the example shown, the process flow 100 includes use of an imaging system, such as a camera 102 of a mobile device 115, to capture images of items at any item location 106. Examples of item locations may include a retail store, but may also include other locations where item collections reside. For example, a warehouse or other storage location may also be utilized. In this context, capturing images of items may include either capturing still images or capturing video content including frame images of the items. In the case of video content, all or fewer than all image frames may be utilized as part of the general image classification process. For example, images may be subselected from among the frames based on clarity, similarity to other images, or other factors.

Capture of images of the items 104 using a camera 102 of the mobile device 115 may include, for example, capturing images as the mobile device passes the items, for example as the mobile device travels along an aisle within a store. However, concurrently with capturing the images of the items, the mobile device 115 may also capture object data, such as point cloud data 110. The point cloud data 110 generally corresponds to detected objects based on differing perspectives between adjacent or nearby frames in sequentially captured image or video content.

In the example shown, the process flow 100 includes providing captured images 108 and point cloud data 110, to a training image data set generation tool 112. In general, the captured images 108 correspond to the still images or frames captured by the mobile device. Additionally, the point cloud data 110 represents objects detected across the plurality of frames as a camera 102 of the mobile device 115 passes a plurality of items 104.

In general, the training image data set generation tool 112 will process the captured images to detect items within each image. The tool 112 may then crop each image to generate cropped images of the items appearing in each image or frame. Each of these cropped images may then optionally be associated with an object that is detected in the point cloud data 110. By a uniquely identifying individual objects in the point cloud data on 110, and then associating cropped images with the correct object, multiple images of the same product item detected as an object may be automatically associated with the same item, and therefore the same classification.

Figure 3:
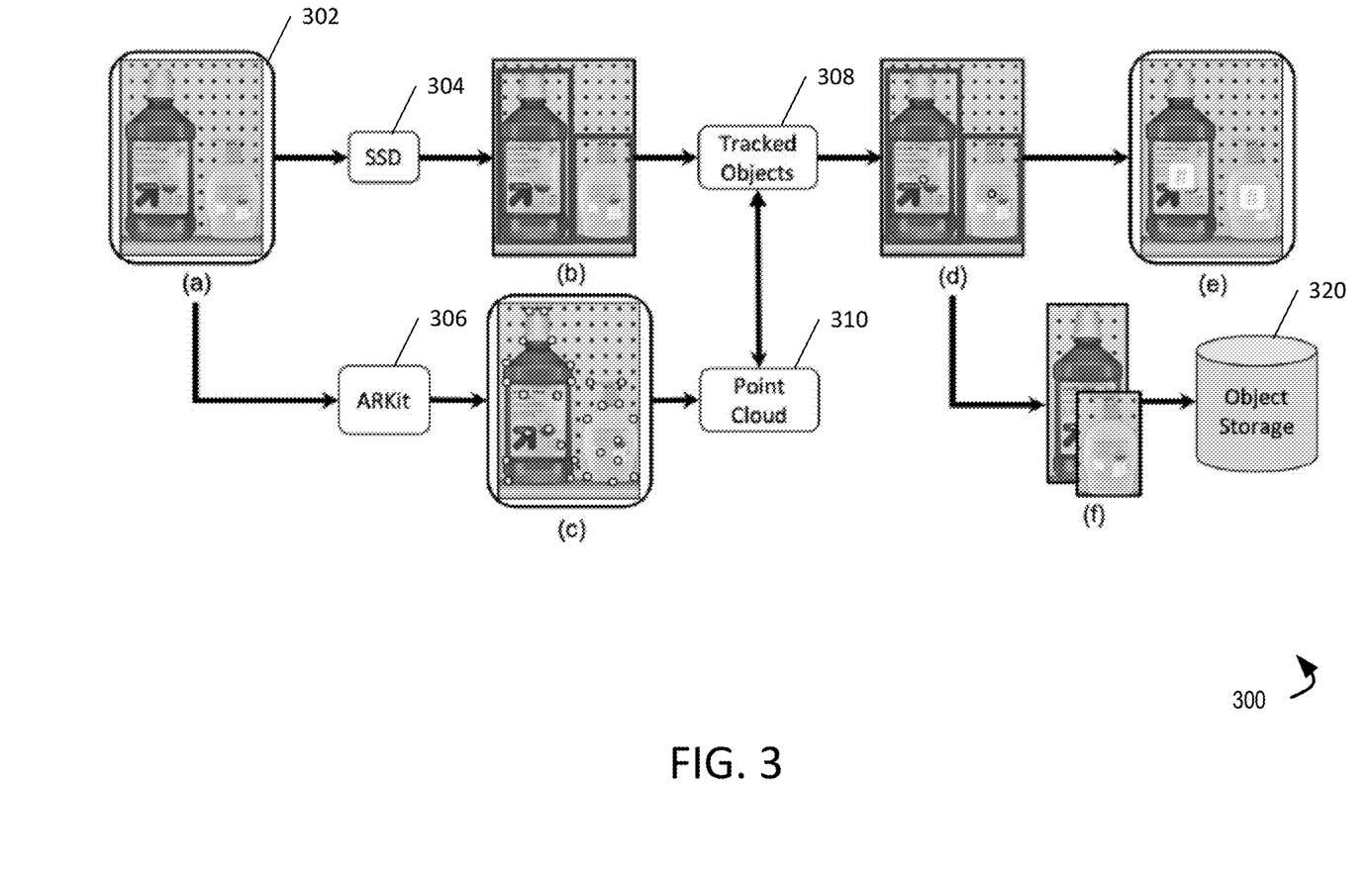
FIG. 3 is a schematic illustration of a process by which a large-scale, fine-grained image classification dataset may be compiled, in accordance with aspects of the present disclosure.

Additionally, the training image data set generation tool 112 he is configured to associate curated item data with each cropped image. The curated item data may include, for example, data stored in a product database, such as a representative commercially generated image, a bar code, and item description, and a classification of the item, e.g., where the item falls within a retail taxonomy. In some embodiments, less than all of the curated item data may be associated with each cropped image.

To associate the curated item data with each of the cropped images, in some embodiments, a mobile device may have a second mode in which the mobile device is configured to display a cropped image associated with an object that was detected during the object and image capture process described previously. A user may then utilize a mobile device 115 to capture an image of a bar code a fixed to a product that corresponds to the cropped image. In some examples, where the cropped image already includes within the it the bar code, this second mode of the mobile device may be unnecessary to be used for that product and associated object and image. Generally, the bar code may be recognized, and label data may be retrieved from curated item data 114, which may include various image labels to be applied to the cropped images based on their association with a particular object. Additional details regarding example operation of the training image data set generation tool 112 are provided below in conjunction with FIG. 3, which describes a particular utilization model in which such a tool is used to generate classification data sets from product images at a retail store.

In the example embodiments, the training image data set generation tool 112 resides on the mobile device 115; in alternative examples, the training image data set generation tool 112 resides at least partially on a server remote from the mobile device 115. For example, capturing and cropping of images 108 may be performed on the mobile device 115, and capturing and generating point cloud data 110 for object detection may also be performed on the mobile device 115. Additionally, capturing of unique identifiers of products, such as bar codes, and may be performed on the mobile device 115. However, linking of barcodes, and associated item data, with detected objects and cropped images of those objects may be performed at a server. Other arrangements are possible as well.

In the example shown, the training image data set generation tool 112 outputs one or more training image datasets 120. The training image datasets are automatically generated, and can be formed to correspond to specific, customized classifications of image data, such as fine-grained image classifications as discussed above. Accordingly, such training image datasets 120 may be used, in whole or in part (or in combination with other coarse-grained or known training datasets), to train a machine learning model 122. Such a machine learning model 122 may correspond to an image classification model that is configured to receive later-captured images to be classified and will generate an image classification prediction, and optionally a confidence level associated with that classification prediction. Such an image classification prediction model may be used, for example, to automatically generate classifications of images for use in a product taxonomy such as a retailer's product collection, for example to add items or add supplemental images to items automatically. Various other applications of customized and/or fine-grained classification training data used in image classification applications are possible as well.

Figure 2:
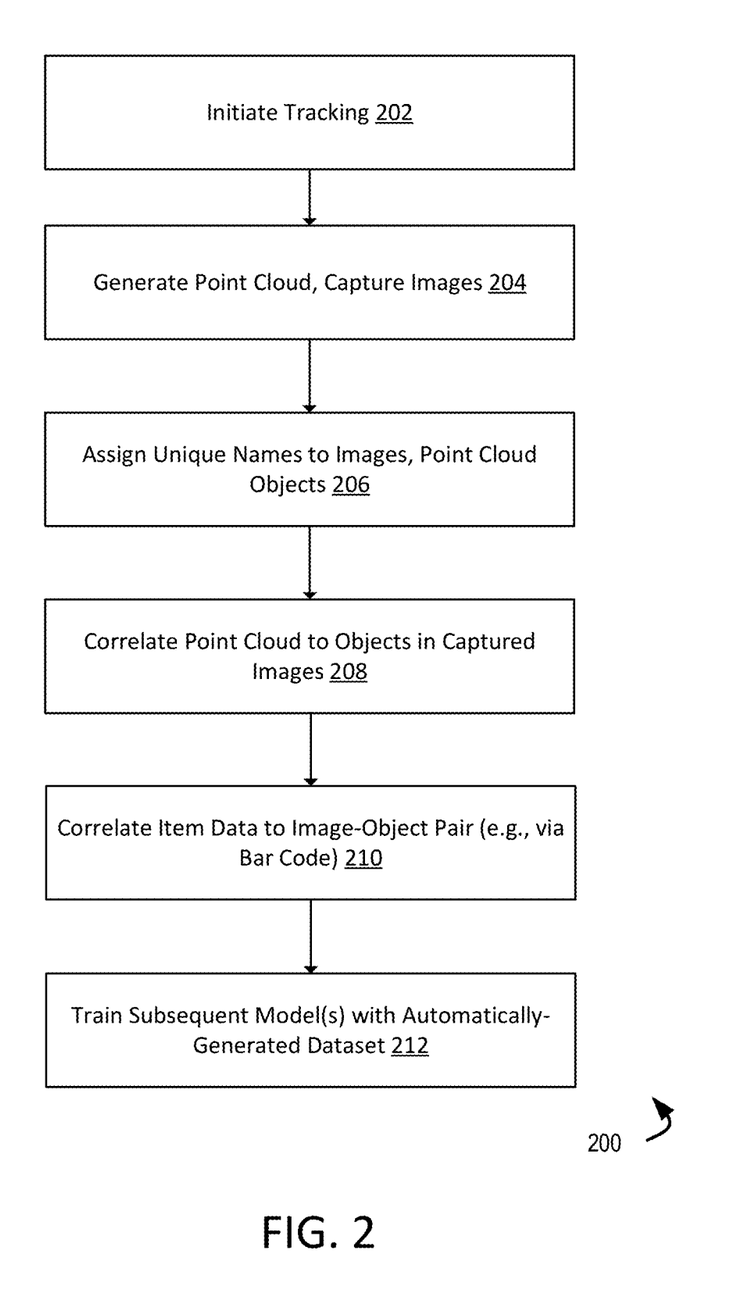
FIG. 2 is a flowchart of a method of large-scale image collection for fine-grained image classification, according to an example embodiment of the present disclosure.

FIG. 2 is a flowchart of a method 200 of large-scale image collection for fine-grained image classification, according to an example embodiment of the present disclosure. The method may be performed, for example, in the context of the use of a mobile device and mobile application installed thereon which implements, at least in part, the training image data set generation tool 112 described above in conjunction with FIG. 1.

In the example shown, the method 200 includes initiating an image capture and tracking operation, for example using a mobile device (step 202). The image capture and tracking operation may be initiated in response to user selection of a mobile application and initiating data collection according to a first mode of the mobile application. The method further includes capturing a series of images to a camera of the mobile device, such as a set of sequential still frame images, or some/all frames of video content (step 204). From the captured series of images, the mobile device will generate cropped images of items in each selected frame or image, and will also generate a point cloud representative of a three-dimensional (depth) model of the objects that are captured in the images.

In example embodiments, to capture cropped images of items, the mobile application will include a single shot multi-box detector (SSD). In some example embodiments, to ensure quality performance, the SSD model is retrained for the context of interest. For example, while an example SSD model used in the context of the present disclosure utilizes a mobilenet-v2 model as an object detection model, in some instances, a small training dataset (e.g., in the range of 100-500 training samples, for example 230 images having 1,430 hand-labeled objects), may be used to fine-tune the model.

As noted above, in example embodiments, all or fewer than all captured images or image frames may be analyzed to detect items in that image, and objects reflected across the images. In example embodiments, a subset of images that are captured every predetermined amount of time may be selected, as a mobile device moves through an environment in which items are located, to allow capture of images of all items within that environment, as well as development of a point cloud defining objects present within the environment.

To generate a point cloud representative of a three-dimensional (depth) model of the objects that are captured in the images, in some embodiments, an augmented reality software toolkit may be used to generate a coarse-grained three-dimensional model. In example embodiments, the ARKit Scene View tool available in Apple Developer from Apple Inc. of Cupertino, California can be used. However, other augmented reality (AR) software packages capable of integration and execution on a mobile device may be used as well.

In the example shown, the method 200 includes assigning unique names to each of the identified objects as well as each of the images for which classification is sought (step 206). In some instances, a universally unique identifier (UUID) may be generated and included in the filename for each image, and assigned to each object.

In the example shown, the method 200 includes correlating objects detected in the point cloud to items captured in and reflected by the cropped images (step 208). This correlation may be performed by, for example, identifying a correlation between a bounding box that defines the cropped image and an anchor point for an object in the point cloud. For example, if a point within a point cloud falls within a bounding box, the image defined by the bounding box can be assigned to the detected object. In some instances, a single central point within the object point cloud may be used as the unique object identifier; in other instances, multiple points on an object within the point cloud are maintained, but tied to a common object identifier.

It is noted that, because each object is identified with a unique identifier, multiple images may be associated with a single object, with an image-to-object relationship being captured and stored. This allows multiple images to be labeled with object data, such that a dataset may include multiple images of the same object having common labels. This improves the overall performance of subsequently-trained machine learning models, since the various images are better able to train the model to recognize and classify the object regardless of the orientation or quality of a subsequently-captured image.

In the example shown, the method 200 includes correlating item data (e.g., object labels) to the uniquely-identified objects, and extending that identification to the images associated with each object (step 210). In example embodiments, this includes identifying a unique identifier associated with an item and correlating that identifier to the unique identifier of the object. A unique identifier of the item may be, for example, associated with a UPC code or bar code associated with the item. Identifying the unique identifier may be performed, for example, by a mobile device, by entering a second mode (as compared to the image/object capture mode above) in which an image of an item is presented and a user is prompted to capture or enter a bar code or other unique identifier of the item. The bar code or other identifier may be uniquely associated with item data in an item database, for example of a retailer or other entity. That item data may then be linked to the object, and by way of the object to the cropped images. Item data may be, in some instances, retrieved from an inventory database of the enterprise or organization creating the annotated image dataset.

In the example shown, once an annotated image dataset is created, that dataset may be used for training and/or validation of one or more machine learning models that are used for image classification (step 212). As noted below, a trained machine learning model may be used for subsequent automatic classification of new images, for example to classify similar images to those on which training is performed.

Referring to FIG. 2 generally, in the context of a retailer, automating annotation of a dataset including retailer inventory (e.g., grocery items) may allow a retailer to be able to predict a fine-grained classification of a new image of a newly-offered product. For example, a new image of a yogurt container may be identified as likely depicting a yogurt container and therefore with high confidence be able to place that item at an appropriate location within the retailer's product taxonomy (e.g., within a grocery, dairy, yogurt hierarchy). Existing image classification datasets may not accurately train according to the specific taxonomy used by such a retailer, and therefore would less accurately generate such classifications.

FIG. 3 is a schematic illustration of a process 300 by which a large-scale, fine-grained image classification dataset may be compiled, in accordance with aspects of the present disclosure. The process 300 may be utilized to generate a large-scale, fine-grained image collection, while minimizing the requirement for manually labeling image data, even for highly-customized or fine-grained classifications. The process 300 is described in the context of generating a set of classification data for a product taxonomy of a retail organization which has a large number of items in its inventory. Such a retail organization may have a frequently-changing product collection, which would benefit significantly from the ability to automatically classify images within its product taxonomy when products are added to that taxonomy.

In this context, and as shown, product images 302 are captured from a mobile device camera feed (graphically depicted at process (a)). The product images are provided to both a single shot multi-box detector (SSD) 304 and to an object tracking algorithm 306, for example the ARKit Scene View tool available in Apple Developer from Apple Inc. of Cupertino, California.

The object tracking algorithm 306, as implemented herein, builds a coarse point cloud 308 (graphically depicted at process (c)) representing a rough 3D view of the world captured by the camera, represented by 3D representation X. Specific points in the point cloud may be elevated as an anchor point once they are determined to be of sufficient interest, e.g., the center of a trackable object. In examples herein, an anchor point may be determined to be a center of an object of interest y from among the collection of objects of interest Y within the 3D representation X.

Within a single frame, the SSD tool 304 generates an output of a set of cropped images to be treated as tracked objects 310. The tracked objects 310 are defined by bounding boxes around each identified object in the image (graphically depicted at process (b)). Each bounding box b is defined by a coordinate point in the image, width and height, i.e., b=((x,y), w, h). Each bounding box is first checked against existing tracked objects in the set of objects Y. If there is an object y within the collection of objects Y for which a 2D projection exists in the bounding box, the object images contained in b is labeled as originating from object y. Otherwise, a hit-test is performed from the center of b to locate a closest point within the overall image X, elevating that point as an anchor point and the object image contained in b is labeled as originating from x. Accordingly, a relationship between each bounding box and a related tracked object is generated, as depicted in process (d).

Accordingly, as seen in FIG. 3, multiple images of the same object may be captured and placed in a real-world context, with each object y acting as an anchor of an object to indicate how many images of the associated tracked object have been collected, and whether that object has been labeled. This overall process allows the mobile device to automatically annotate and collect cropped images efficiently, and cluster multiple images of the same object together.

In the example shown in FIG. 3, the detected objects may be stored in an object storage 320. While in example embodiments the image collection, cropping, object detection, and association between cropped images and objects are performed on a mobile device, aspects of the present disclosure are also performed on a remote server or storage device. For example, for captured images, a cloud object storage service may be used to store images (e.g., the cropped images). In some examples, a separate relational database may also be maintained in the same remote server or cloud storage, which stores image-to-object relationships. This allows a single label to propagate to the entire cluster of images and image-object relationships, making all data readily available for future model training.

In example embodiments, at either the time of capture or at the time transferred to object storage 320, tracked objects and image file names are given unique names. For example, each tracked object will be assigned a universally unique identifier (UUID) as an object name, and each cropped image will have an associated UUID as its image name. All images are sent to a queue for processing and transmitting to a data storage service with the associated filename (as seen in process (f)). In some cases, a separate queue may be used to send image-to-object relationships to the same data storage service.

It is noted that the generalized process 300 described in conjunction with FIG. 3 will rapidly associate item images with a particular object, and can tie multiple such images to a single object. However, at this point, the object is not yet associated with a label. Accordingly, and as discussed above in conjunction with FIGS. 1-2, the mobile device may have a second mode that may be selected in which a user may be presented with an object identifier and optionally one of the captured images of the object, and requests a scan of the bar code associated with that image. Once the bar code image is scanned, this information will be sent to the data storage service, providing a link between the UUID of the tracked object and the barcode data, thereby applying all of the labels that are associated with a particular item represented by the barcode data to that object, and therefore each of the cropped images that were previously associated with the object.

In accordance with the present disclosure, the above-described process allows for rapid capture of images and tracked objects within a physical item universe that represents a taxonomy of items to be used as an item classification dataset. In a particular example experiment, 45,000 tracked objects were detected and 264,000 images were captured using this automated image annotation process. Of that data, 13,000 objects were labeled (e.g., via capture of an associated bar code). The 13,000 labeled objects corresponded to 8,500 unique products, for which 114,000 images were captured and associated with those 13,000 tracked objects, at a rate of 24.5 images per minute of unlabeled images, and 10.5 labeled images per minute. Accordingly, because no further labeling work is necessary since object-to-product links are created via the bar code, it can be seen that a large set of custom-labeled images are readily generated.

Figure 4:
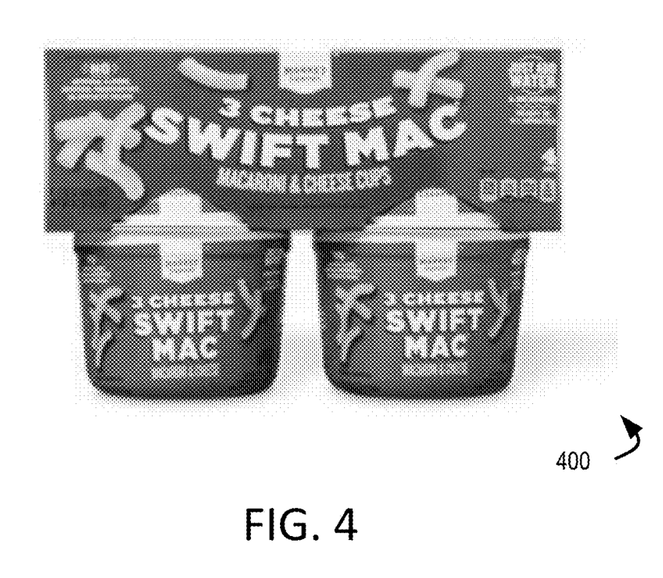
FIG. 4 is an example curated image of a product that may be associated with a particular product within a fine-grained product taxonomy, according to example aspects of the present disclosure.
Figure 5:
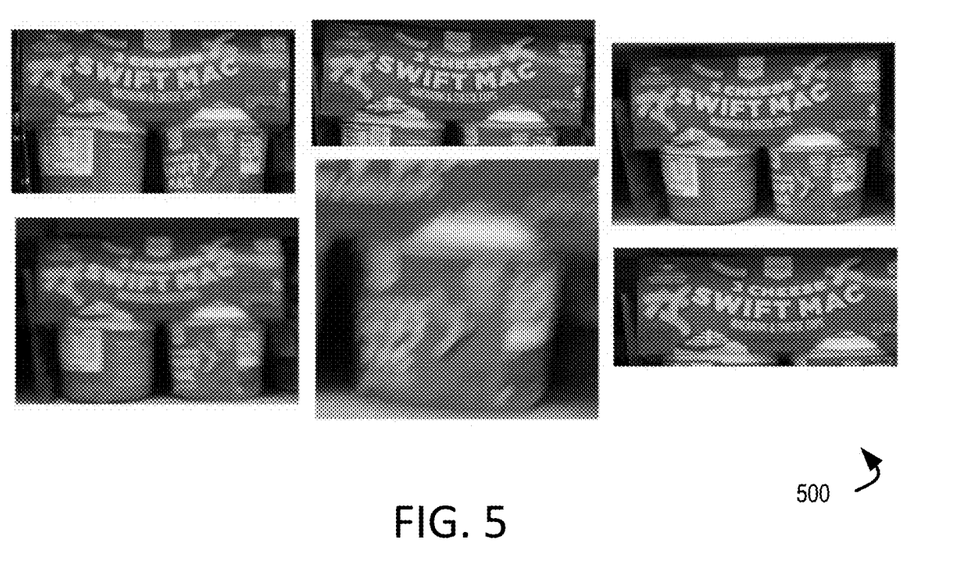
FIG. 5 is an example image collection corresponding to the product represented in FIG. 4, in which images of varying quality and orientation may be captured for recognition of the item.
Figure 6:
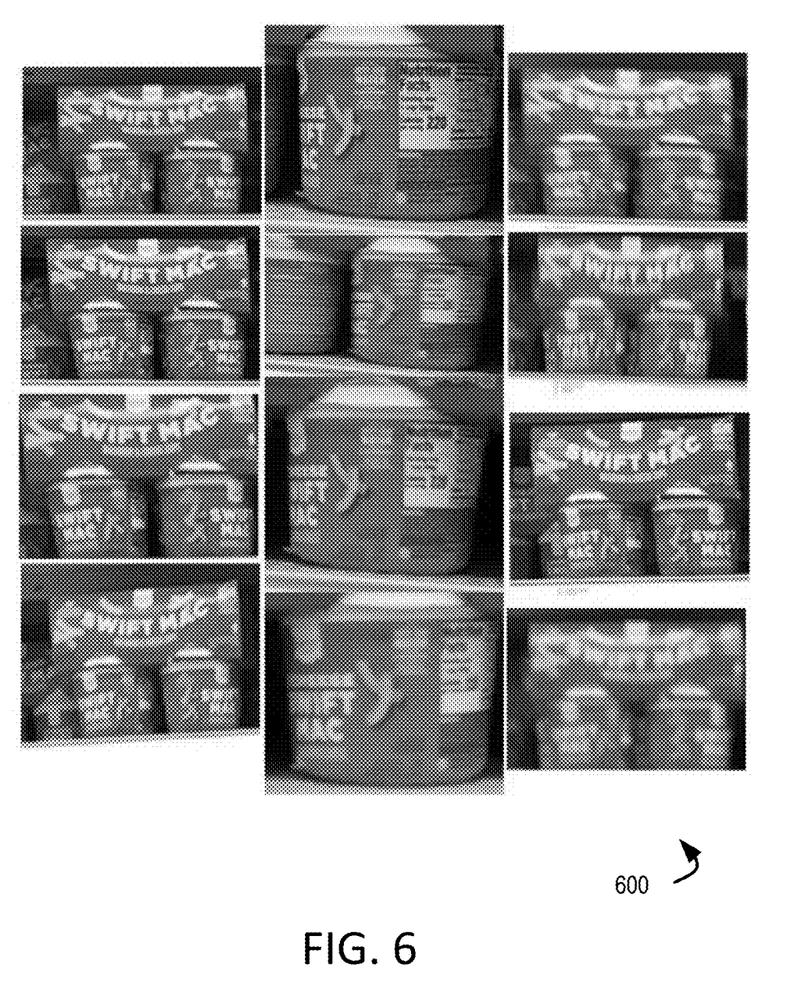
FIG. 6 is a further example image collection corresponding to the product represented in FIG. 4, in which images of varying quality and orientation may be captured for recognition of the item.

Referring to FIGS. 4-6, example images from an experimental image collection and annotation process are depicted. FIG. 4 illustrates an example curated image 400 of a product that may be organized within a fine-grained product taxonomy, according to example aspects of the present disclosure. To obtain additional images of that same product/item, the mobile application described herein was utilized to obtain an initial collection of images, seen in the image collection 500 of FIG. 5. In that collection 500, images of varying quality and orientation are captured for recognition of the item. Additionally, an expanded image collection 600, seen in FIG. 6, can be collected to provide broader context for identification/classification of the same item from images.

The use of various images, including professional product images and captured images, allows for decoupling of the images that are collected from the context in which they are collected. In other words, the same product should be recognizable in an image regardless of the context (background) in which the image is collected. Use of both captured images and professional product images improves overall performance by removing some of the image capture context from at least some of the images associated with an item.

Testing/Validation of Image Collection

Using the methods and systems described above, image collections may be rapidly developed by image capture and automated linking to objects which are in turn linked to item labels (e.g., via bar code or other unique identifier). Such automated image collection and annotation systems may be tested for accuracy relative to product image collections generated using other approaches.

In one example experiment, a product image dataset of a retailer is assessed as to accuracy using a Resnet50 convolutional neural network (CNN) to output image embeddings for a k-NN classifier. In this example, a final pooling layer of the network is put through a fully-connected layer to product embeddings of dimension 100. The network is trained using a proxy-NCA loss (batch size: 32) and Adam optimizer (with learning rate of $10^{-4}$), with three experiments considered: intra-domain learning in which query and catalog sets are from the same image domain and the embedding is trained on labeled "in-the-wild" product images, supervised cross-domain learning in which a catalog set is taken from professional item photos, and weakly-supervised intra-domain learning in which embeddings are trained using unlabeled "in-the-wild" photos, using an entity ID as a proxy for actual labels.

As seen in the results below, a mean average precision (mAP) is assessed in each of the experiments, when using the dataset generated from a retailer's product collection as discussed above.

In the supervised intra-domain assessment, accuracy of the top-1, top-5, and top-10 image classifications are shown:

| Top-1 | Top-5 | Top-10 | mAP |
|---|---|---|---|
| 0.32 | 0.75 | 0.87 | 0.45 |

In the cross-domain assessment, the same trained embedding model is used as in the supervised intra-domain assessment, but using classification against official product images. Accordingly, embeddings of the official product images are processed using CORAL, matching the mean and covariance of the embeddings to the dataset, with top-1, top-5, top-10, and mAP also tracked:

| Top-1 | Top-5 | Top-10 | mAP |
|---|---|---|---|
| 0.03 | 0.10 | 0.14 | 0.024 |

In the weakly-supervised assessment, the dataset is assessed when used in weakly-supervised learning. In this assessment, unlabeled images are used as a training set, with images labeled only by entity ID. Accordingly, images of the same entity will be of the same product (e.g., matching the image-to-object relationships as established above). As seen below, the dataset constructed from unlabeled, captured images (labeled as "Tater" below) may provide only limited reduction in accuracy as compared to using an official image dataset, which typically must be manually curated.

| Test set | Top-1 | Top-5 | Top-10 | mAP |
|---|---|---|---|---|
| Tater | 0.24 | 0.65 | 0.76 | 0.37 |
| Official | 0.02 | 0.08 | 0.12 | 0.022 |

Accordingly, it can be seen from the above assessments, a dataset generated using automated image capture and classification can provide reasonable accuracy when used to train subsequent machine learning models, while vastly reducing the amount of time required to generate such a dataset.

Computing System

Figure 7:
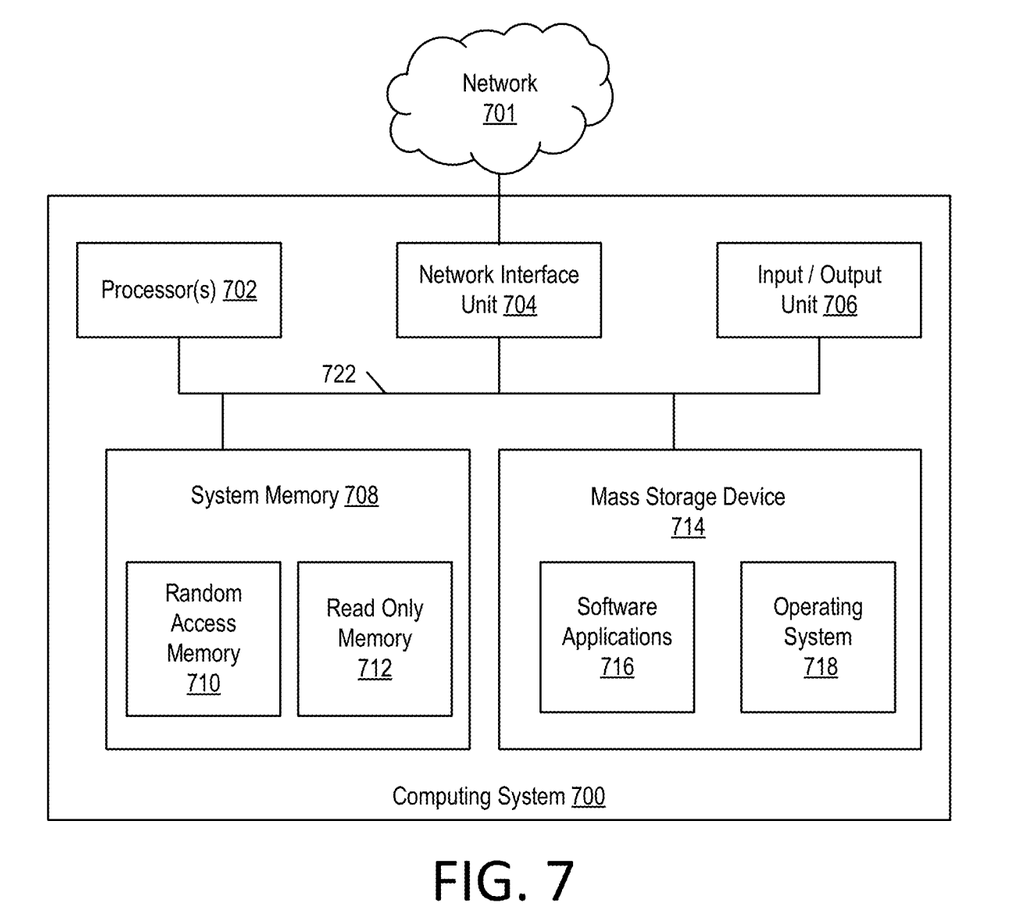
FIG. 7 is an example computing system with which aspects of the present disclosure may be implemented.

FIG. 7 illustrates an example block diagram of a virtual or physical computing system 700. One or more aspects of the computing system 700 can be used to implement the automated dataset generation system and automated image classification system described above, store instructions described herein, and perform operations described herein.

In the embodiment shown, the computing system 700 includes one or more processors 702, a system memory 708, and a system bus 722 that couples the system memory 708 to the one or more processors 702. The system memory 708 includes RAM (Random Access Memory) 710 and ROM (Read-Only Memory) 712. A basic input/output system that contains the basic routines that help to transfer information between elements within the computing system 700, such as during startup, is stored in the ROM 712. The computing system 700 further includes a mass storage device 714. The mass storage device 714 is able to store software instructions and data. The one or more processors 702 can be one or more central processing units or other processors.

The mass storage device 714 is connected to the one or more processors 702 through a mass storage controller (not shown) connected to the system bus 722. The mass storage device 714 and its associated computer-readable data storage media provide non-volatile, non-transitory storage for the computing system 700. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 700.

According to various embodiments of the invention, the computing system 700 may operate in a networked environment using logical connections to remote network devices through the network 701. The network 701 is a computer network, such as an enterprise intranet and/or the Internet. The network 701 can include a LAN, a Wide Area Network (WAN), the Internet, wireless transmission mediums, wired transmission mediums, other networks, and combinations thereof. The computing system 700 may connect to the network 701 through a network interface unit 704 connected to the system bus 722. It should be appreciated that the network interface unit 704 may also be utilized to connect to other types of networks and remote computing systems. The computing system 700 also includes an input/output controller 706 for receiving and processing input from a number of other devices, including a touch user interface display screen, or another type of input device. Similarly, the input/output controller 706 may provide output to a touch user interface display screen or other type of output device.

As mentioned briefly above, the mass storage device 714 and the RAM 710 of the computing system 700 can store software instructions and data. The software instructions include an operating system 718 suitable for controlling the operation of the computing system 700. The mass storage device 714 and/or the RAM 710 also store software instructions, that when executed by the one or more processors 702, cause one or more of the systems, devices, or components described herein to provide functionality described herein. For example, the mass storage device 714 and/or the RAM 710 can store software instructions that, when executed by the one or more processors 702, cause the computing system 700 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of product classification, similar technologies may be used for automated and/or rapid generation of fine-grained annotated image collections useable as training data for customized image classification operations across a variety of technical applications.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of generating a fine-grained annotated image collection comprising:
    receiving a plurality of image frames, the image frames depicting a plurality of product items;
    for each of the plurality of image frames, generating one or more cropped images, the one or more cropped images representing each product item appearing in the image frame;
    detecting a plurality of objects appearing across the plurality of image frames;
    associating at least one of the cropped images generated from an image frame with a detected object from among the plurality of objects tracked across the plurality of image frames;
    receiving a unique identifier of the detected object; and
    annotating the at least one cropped image by applying a label the at least one cropped image, wherein applying the label includes determining an item label of the detected object based on the unique identifier and associating the item label with the at least one cropped image.

2. The method of claim 1, wherein tracking objects across the plurality of image frames includes generating a point cloud based on the image frames.

3. The method of claim 2, wherein tracking objects across the plurality of image frames further includes estimating a location of objects in three-dimensional space relative to a mobile device used to capture the plurality of image frames.

4. The method of claim 3, wherein associating the at least one of the cropped images with a detected object includes associating cropped images obtained across two or more of the plurality of image frames with the detected object.

5. The method of claim 1, wherein annotating the at least one cropped image comprises applying the label to each of a plurality of cropped images obtained across two or more of the plurality of image frames with the detected object.

6. The method of claim 1, wherein generating the one or more cropped images includes forming a bounding box around each image appearing in the image frame.

7. The method of claim 1, wherein the plurality of image frames is received from a mobile device.

8. The method of claim 7, wherein the unique identifier comprises a bar code associated with a product item appearing in the at least one cropped image, and wherein determining the item label includes receiving an image of the bar code using the mobile device.

9. The method of claim 1, further comprising associating a unique name with each detected object within the plurality of objects.

10. The method of claim 1, further comprising associating a unique name with each of the one or more cropped images.

11. The method of claim 1, wherein the unique identifier is an identity of an object within a fine-grained image taxonomy.

12. A system comprising:
one or more processors;
memory comprising instructions that when executed by the one or more processors, cause the system to:
receive a plurality of image frames, the plurality of image frames depicting a plurality of product items;
for each of the plurality of image frames, generate one or more cropped images, the one or more cropped images representing each product item appearing in the image frame;
detect a plurality of objects appearing across the plurality of image frames;
receive a unique identifier associated with each detected object, the unique identifier being an identity of an object within a fine-grained image taxonomy; and
annotate the at least one cropped image by applying a label the at least one cropped image, wherein applying the label includes determining an item label of the detected object based on the unique identifier and associate the item label with the at least one cropped image.

13. The system of claim 12, wherein annotating the at least one cropped image comprises applying the label to each of a plurality of cropped images obtained across two or more of the plurality of image frames with the detected object.

14. The system of claim 12, wherein the instructions when executed by the one or more processors further cause the system to: store the plurality of cropped images in a first data store and store associations between the plurality of cropped images and the plurality of objects in a second data store.

15. The system of claim 12, wherein each of the plurality of cropped images has a unique name and each of the plurality of objects has a unique name.

16. The system of claim 12, further comprising an image classification model trainable using a training dataset including the generated annotated image collection, the image classification model configured to, based on the training dataset, generate a classification prediction based on one or more received images to be classified.

17. The system of claim 16, wherein the one or more received image sets comprise a set of images of products offered by a retailer, and wherein the products offered by the retailer are arranged in a fine-grained classification system specific to the retailer.

18. A method comprising:
capturing a plurality of image frames, the plurality of image frames depicting a plurality of product items;
for each of the plurality of image frames, generating one or more cropped images, the one or more cropped images representing each product item appearing in the image frame;
detecting a plurality of objects appearing across the plurality of image frames;
capturing a unique identifier associated with each detected object, the unique identifier being an identity of an object within a fine-grained image taxonomy; and
transmitting the plurality of cropped images, information regarding the plurality of objects, and the unique identifier associated with each of the plurality of objects to a remote computing system to form an annotated image collection.

19. The method of claim 18 wherein the plurality of image frames are captured using a camera of a mobile device.

20. The method of claim 19, wherein capturing the unique identifier of each detected object comprises capturing an image of a bar code affixed to each product item and accessing item labels stored in an item database to be applied to the cropped image.

* * * * *